(12) United States Patent
Wilkinson

(10) Patent No.: US 7,308,911 B2
(45) Date of Patent: Dec. 18, 2007

(54) ELECTRONICALLY DETECTABLE HIGH-PRESSURE HOSE AND METHOD OF DETERMINING THE LOCATION OF THE HOSE

(75) Inventor: Daniel M. Wilkinson, Cadillac, MI (US)

(73) Assignee: Kuriyama of American, Inc., Schaumburg, IL (US)

( * ) Notice: Subject to any disclaimer, the term of this patent is extended or adjusted under 35 U.S.C. 154(b) by 0 days.

(21) Appl. No.: 11/211,857

(22) Filed: Aug. 25, 2005

(65) Prior Publication Data

US 2006/0081301 A1   Apr. 20, 2006

Related U.S. Application Data

(60) Provisional application No. 60/522,204, filed on Aug. 31, 2004, provisional application No. 60/522,181, filed on Aug. 26, 2004.

(51) Int. Cl.
*F16L 55/00* (2006.01)
(52) U.S. Cl. ............... 138/104; 138/127; 138/143; 138/132; 405/157; 324/326; 174/98
(58) Field of Classification Search ............... 138/104, 138/127, 132, 143; 405/157; 324/326; 174/98
See application file for complete search history.

(56) References Cited

U.S. PATENT DOCUMENTS

| | | | | |
|---|---|---|---|---|
| 3,367,370 A * | 2/1968 | Sherlock | .................. | 138/104 |
| 3,726,321 A | 4/1973 | Phillips et al. | .............. | 138/123 |
| 3,945,867 A | 3/1976 | Heller, Jr. et al. | .......... | 156/143 |
| 4,501,629 A | 2/1985 | Satzler | ...................... | 156/149 |
| 4,573,016 A * | 2/1986 | Nakamura et al. | .......... | 324/326 |
| 4,585,035 A | 4/1986 | Piccoli | ...................... | 138/127 |
| 4,593,853 A | 6/1986 | Schad et al. | ............. | 138/141 X |
| 4,652,861 A * | 3/1987 | Domes | .................... | 340/539.1 |
| 4,675,780 A * | 6/1987 | Barnes et al. | ................ | 361/215 |
| 4,754,685 A | 7/1988 | Kite et al. | ............... | 138/123 X |
| 4,767,237 A * | 8/1988 | Cosman et al. | ............. | 405/157 |
| 4,789,005 A | 12/1988 | Griffiths | ..................... | 138/103 |
| 4,836,080 A | 6/1989 | Kite, III et al. | .......... | 138/103 X |
| 4,898,212 A | 2/1990 | Searfoss et al. | ............. | 138/130 |
| 5,017,873 A * | 5/1991 | Rippingale et al. | .......... | 324/326 |
| 5,036,210 A * | 7/1991 | Goodman | ................... | 235/493 |
| 5,051,034 A * | 9/1991 | Goodman | ................... | 405/157 |
| 5,114,517 A * | 5/1992 | Rippingale et al. | ......... | 156/187 |
| 5,151,657 A * | 9/1992 | Tashjian | ..................... | 324/326 |
| 5,264,795 A * | 11/1993 | Rider | ......................... | 324/326 |
| RE34,701 E * | 8/1994 | Goodman | .............. | 156/244.11 |
| 5,361,806 A | 11/1994 | Lalikos et al. | .............. | 138/109 |
| 5,362,530 A | 11/1994 | Kitami et al. | ........... | 138/126 X |
| 5,381,834 A | 1/1995 | King | .......................... | 138/125 |
| 5,551,484 A * | 9/1996 | Charboneau | ................ | 138/104 |
| 5,617,031 A * | 4/1997 | Tuttle | ........................ | 324/326 |

(Continued)

*Primary Examiner*—Patrick F. Brinson
(74) *Attorney, Agent, or Firm*—Wood, Phillips, Katz, Clark & Mortimer

(57) ABSTRACT

A hose is provided having at least one layer defining a tubular body with a length and an electrically conductive lead joined to the tubular body and extending along the length of the tubular body. The electrically conductive lead is adapted to receive an electrical signal and create an electromagnetic field that can be remotely detected to determine a location of the hose. A method of determining the location of a hose is also contemplated.

26 Claims, 4 Drawing Sheets

U.S. PATENT DOCUMENTS

| | | | |
|---|---|---|---|
| 5,622,210 A | 4/1997 | Crisman et al. | 138/104 |
| RE35,527 E | 6/1997 | Martucci | 174/47 |
| 5,644,237 A * | 7/1997 | Eslambolchi et al. | 324/326 |
| 5,690,146 A | 11/1997 | Stammen | 138/36 |
| 5,744,206 A | 4/1998 | Russek et al. | 428/36.3 |
| 5,798,644 A * | 8/1998 | Eslambolchi et al. | 324/326 |
| 6,092,558 A * | 7/2000 | Maccario | 138/178 |
| 6,109,306 A | 8/2000 | Kleinert | 138/127 |
| 6,112,771 A | 9/2000 | Aoyagi et al. | 138/127 |
| 6,155,304 A | 12/2000 | Hsich et al. | 138/137 |
| 6,257,280 B1 | 7/2001 | Marena | 138/125 |
| 6,302,150 B1 | 10/2001 | Martucci et al. | 138/125 |
| 6,321,794 B1 | 11/2001 | Ishida et al. | 138/121 |
| 6,380,743 B1 * | 4/2002 | Selvog | 324/326 |
| 6,390,141 B1 | 5/2002 | Fisher et al. | 138/137 |
| 6,529,006 B1 * | 3/2003 | Hayes | 324/326 |
| 6,933,438 B1 * | 8/2005 | Watts et al. | 174/48 |

* cited by examiner

ELECTRONICALLY DETECTABLE HIGH-PRESSURE HOSE AND METHOD OF DETERMINING THE LOCATION OF THE HOSE

CROSS-REFERENCE

This application claims the benefit of Provisional Application Ser. Nos. 60/522,181, filed Aug. 26, 2004 and 60/522,204, filed Aug. 31, 2004.

BACKGROUND OF THE INVENTION

1. Field of the Invention

The invention relates to hoses. In one of its aspects, the invention relates to a high-pressure hose for cleaning buried pipelines which can be accurately located along its length in the pipeline. In another of its aspects, the invention relates to a high-pressure hose for cleaning buried pipelines wherein the three-dimensional position of the hose can be accurately determined along its length in the pipeline. In yet another of its aspects, the invention relates to a method for determining the position of a high pressure hose within a blocked underground conduit.

2. Background Art

Buried pipelines, such as sewer lines, typically require periodic maintenance and cleaning, which is accomplished by inserting a high-pressure hose into the sewer line and introducing a pressurized cleaning fluid through the hose to clean and flush the sewer line. Typical sewer lines may be buried at depths ranging from 5 to 13 feet below grade, and may be too small to enable a worker to enter and directly observe the location of the hose. During sewer maintenance and cleaning procedures, it is often difficult to accurately determine the location of down-hole blockages. At present, a commonly used method to determine a blockage location involves sending a second probe through the pipeline or using a contact measuring device that rolls on the hose as it dispenses in order to establish the length of hose introduced into the line. However, these methods only provide approximate measurements.

It is frequently desirable to know the route the hose takes. This is particularly important when an obstruction has been encountered and must be removed by excavating down to the pipeline at the point of the obstruction. If an unserviceable obstruction is encountered and digging is required, the accurate surface location of the obstruction must be established. Sewer lines do not always run in straight lines, and some drain networks can be complex, with many branches, thus complicating the search for an obstruction. Branching sewer lines may require maintenance, and the status of each branch must therefore be established during the maintenance process. Accurate location of the hose is necessary in these circumstances.

Common locating systems are only capable of locating the metal, or fitting, end of the hose. The location of the hose itself is indeterminate. Inaccurate location of the hose may contribute to missed obstruction excavations, damage to adjacent sewer networks during excavation to an obstruction, or missed or improperly maintained branches.

U.S. Pat. No. 5,243,128, to Marcoz, discloses a mobile sewer cleaning apparatus with a flexible, multi-layer hose having markers with magnetic or electrical characteristics different from those of the hose. As the hose is paid out, the markers pass through an electromagnetic detector which provides information on the length of the hose paid out.

U.S. Pat. No. 5,469,916, to Sas-Jaworsky et al, discloses a system for depth measurement in a wellbore with multi-layer tubing having detectable indicia spaced along the length thereof, and a depth measuring device with sensors appropriate for the type of indicia used. The depth measuring device counts the number of indicia that pass the device, thereby measuring the depth of the tubing in the wellbore.

Patent Abstracts of Japan Publication No. 10026267 discloses a multi-layer hose with inner and outer layers and a woven reinforcement layer therebetween. Metal wires are wound around one of the reinforcement threads at preselected intervals to form markers along the hose. As the hose is paid out, it passes through a metal sensor that detects a change in magnetic field to measure the length of the hose.

Patent Abstracts of Japan Publication No. 06241770 discloses a hose length measuring system for manufacturing hose of a preselected length. The hose has spaced markers that can be read by a sensor. Data from the sensors is sent to a data processor which calculates the length of the hose.

U.S. Pat. No. 4,446,892, to Maxwell, discloses an apparatus for monitoring lengths of hose with individual multi-layered hose sections that are interconnected. The hose sections are made, in part, of a synthetic rubber tube and an overlying textile ply. A coil of fine wire is wrapped around the tube beneath the textile ply, and is connected to a sensing unit. The introduction of fluid between the tube and the textile ply due to a rupture of the tube will alter the electromagnetic characteristics of the wire, which will be detected by the sensing unit.

U.S. Pat. No. 5,036,210, to Goodman, and U.S. Pat. No. 6,092,558, to Maccario, disclose underground pipe with magnetically detectable materials incorporated therein or thereon so that the pipe can be detected from above ground by a magnetic field detection apparatus.

U.K. Patent Application Publication No. 2,183,044 discloses an apparatus for measuring the displacement of elongate elements, such as wire rope, having helically coiled strands whose ferromagnetic properties vary periodically along its length. A polarizing magnet and a magnetic field sensor are mounted next to the wire rope. As the wire rope passes the magnet, the sensor detects the variation in the magnetic field and measures the displacement of the wire rope. A second sensor can be used to determine the direction of travel.

It would be desirable to have a flexible high-pressure hose which can be introduced into buried pipelines and whose exact location can be determined from above ground.

SUMMARY OF THE INVENTION

In one form of the invention, a hose is provided having at least one layer defining a tubular body with a length and an electrically conductive lead joined to the tubular body and extending along the length of the tubular body. The electrically conductive lead is adapted to receive an electrical signal and create an electromagnetic field that can be remotely detected to determine a location of the hose.

In one form, the hose is provided in combination with a generator for a signal that is received by the electrically conductive lead and causes an electromagnetic field to be created.

In one form, the hose is provided in combination with a receiver for detecting the electromagnetic field and providing an indication as to the location of the hose.

In one form, the tubular body has an inner tube and a cover layer overlying the inner tube and encapsulating at least a part of the electrically conductive lead.

In one form, the body has at least one reinforcing layer between the inner tube and cover layer.

The electrically conductive lead may be a wire.

The electrically conducive lead may be a flat braided wire.

In one form, the electrically conductive lead is a wire that is adhered to the inner tube.

In one form, the electrically conductive lead is interwoven with the reinforcing layer.

In one form, the reinforcing layer may be a woven conductor that defines the electrically conductive lead.

In one form, the hose has an end with a conductive coupling and the electrically conductive lead is electrically connected to the coupling so that an electrical signal can be directed through the coupling to another hose.

In one form, the generator is a signal/frequency generator that transmits current at a preselected frequency to set up the electromagnetic field.

In one form, the receiver gives an indication of a value associated with the electromagnetic field that is proportional to the strength of the electromagnetic field so that a distance between the receiver and electrically conductive lead can be ascertained.

In one form, the hose is provided in combination with a subterranean pipeline through which the hose is directed.

The invention is further directed to the combination of a signal generator, a hose, an electrical lead, and a receiver. The hose has a tubular body with a length. The electrical lead is provided on the body and is adapted to receive an electrical signal from the signal generator so as to create an electromagnetic field. The receiver detects the electromagnetic field and provides an indication as to the location of the hose.

In one form, the signal generator is provided on the hose.

In one form, the signal generator and electrical lead interact wirelessly.

The invention is further directed to a method of determining the location of a hose, which method includes the steps of: forming a hose with an electrically conductive lead; causing an electrical current to be generated in the electrically conductive lead that creates an electromagnetic field; and detecting the electromagnetic field to thereby determine the location of the hose.

In one form, the step of forming a hose involves forming a hose with a tubular body with the electrically conductive lead embedded in the body.

In one form, the step of forming a hose involves forming a hose with an electrically conductive lead that is in the form of wire, which may be braided or unbraided.

In one form, the step of forming a hose involves forming a hose with a tubular body with an inner tube and a cover layer overlying the inner tube and encapsulating at least a part of the electrically conductive lead.

In one form, the step of forming a hose involves forming a hose with a body having an inner tube, a cover layer, and at least one reinforcing layer between the inner tube and cover layer, wherein the electrically conductive lead is interwoven with a reinforcing layer.

The step of detecting the electromagnetic field may involve sensing the strength of the electromagnetic field to thereby allow a distance from the hose to be ascertained.

The method may further involve the step of directing the hose through a subterranean pipeline.

The method may further include the step of directing a pressurized fluid through the hose and into the subterranean pipeline.

The method may further include the step of tracking movement of the hose through the subterranean pipeline by detecting the electromagnetic field.

The method may further include the step of directing a hose through a subterranean pipeline up to an obstruction, and, through detection of the electromagnetic field, determining the location of the obstruction.

The method of forming a hose may involve forming a hose with a plurality of markers thereon. The method may further include the step of detecting the markers to thereby determine a length of the hose that has been extended.

The method may further include the step of controlling a retrieval speed for paid out hose based upon the detection of the markers.

DESCRIPTION OF AN EMBODIMENT OF THE INVENTION

Figure 1:
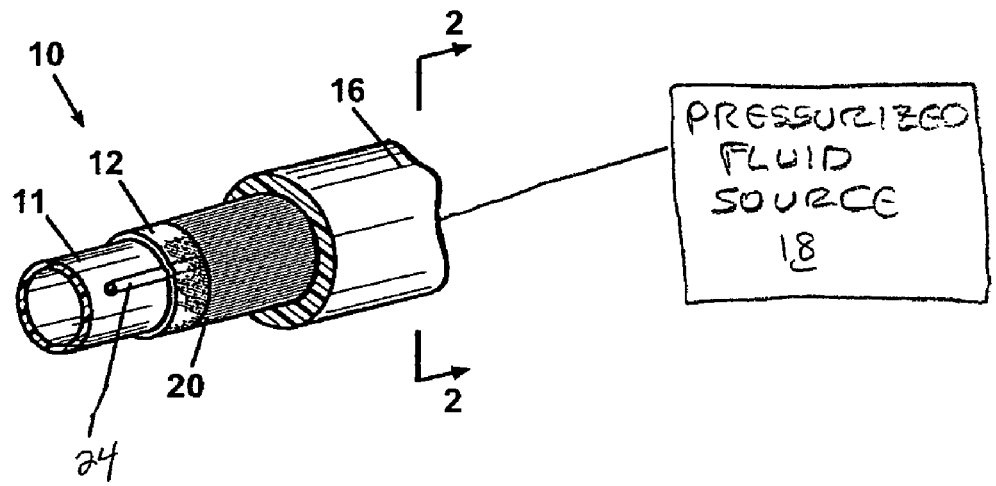
FIG. 1 is a perspective cutaway view of an embodiment of a hose according to the invention.
Figure 2:
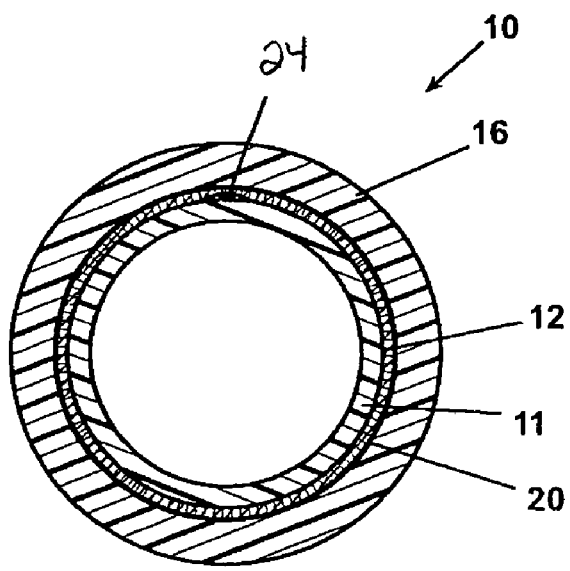
FIG. 2 is a cross-sectional view of the hose of FIG. 1 taken along view line 2-2.

Referring to FIGS. 1 and 2, an embodiment of a hose 10, according to the invention, consists of a tubular body made up of an inner tube 11, a first reinforcing layer 12, overlying the inner tube 11 to provide resistance against bursting, and an outer cover layer 16 encasing the inner tube 11 and the reinforcing layer 12. It should be noted that the invention is described herein with reference to a hose for carrying fluid under high pressure from a source 18. The scope of the invention encompasses a hose carrying fluid under low pressure as well.

The inner tube 11 is an annular member made from a suitable material compatible with the fluid to be transported through the hose 10, and the pressures to which the hose 10 is to be subjected. In a preferred embodiment, the inner tube 11 is made from a non-electrically conductive material that may be semi-rigid thermoplastic material, such as polyethylene or nylon. Typically, polyethylene is utilized when the hose will carry water or certain aqueous solutions, and nylon is utilized when the hose will carry organic or hydraulic fluids. Polyester tubes can also be utilized for hydraulic fluids. Alternatively, the inner tube 11 can be made from an elastomeric material such as rubber. The flexibility of the inner tube 11 can also be selectively varied from rigid to flexible.

The reinforcing layer 12 preferably is a generally conventional sleeve fabricated of multifilament yarn that is adapted to fit tightly around the inner layer 11. The reinforcing layer 12 can be formed in a variety of patterns, including spiral wound, knit, or braided in a manner well-known in the industry to be suitable for the pressure to be carried by the hose 10. Suitable materials for the reinforcing layer 12 include polypropylene, aramid strands such as Kevlar®, or nylon. Suitable reinforcing materials include Fortrel®polyester manufactured by KoSa of Houston, Tex., and Nylon 840 manufactured by DuPont.

The cover layer 16 may be a thermoplastic or thermoset polymer capable of controlled flow within a preselected elevated temperature range. Suitable materials for the cover layer 16 include polyurethane, a thermoplastic rubber, rubber, or silicone. A preferred material is polyurethane. The material selected for the cover layer 16 can also include an additive selected to increase the abrasion resistance of the cover layer material.

For illustrative purposes, the hose 10 of FIGS. 1 and 2 also has a second reinforcing layer 20 between the first reinforcing layer 12 and the cover layer 16. Depending upon the pressures to which the hose 10 is to be subjected, the second reinforcing layer 20 can be included or omitted. Alternatively, additional layers (not shown)can be added between the tube 11 and the cover layer 16 for increased bursting strength or abrasion resistance. An example of a hose with an abrasion resistant layer is described in U.S. patent application Ser. No. 10/707,925, filed Jan. 26, 2004, which is fully incorporated herein by reference.

Joined to/embedded in the tubular body, and extending between the tube 11 and the reinforcing layer 12, is an electrical/electrically conductive, transmitting lead 24. The transmitting lead 24 extends longitudinally/lengthwise along the hose 10 generally parallel to the longitudinal axis of the hose 10. In a preferred embodiment, the transmitting lead 24 is made from flat braided wire, preferably copper braided wire, although other electrically conductive materials can be used, such as aluminum or stainless steel. Alternatively, the transmitting lead 24 can be formed as a single strand wire or round braided wire, and can be made of copper, stainless steel, aluminum, or similar electrically conductive materials. In general, flat braided wire is more flexible and/or has a smaller overall diameter than a single strand wire or round braided wire having the same electrical conductivity and signal transmission properties. Preferably, the transmitting lead 24 is attached to the inner tube 11 through a suitable adhesive during the hose fabrication process.

Alternatively, the transmitting lead 24 can be interwoven with the reinforcing layer 12, can make up part or all of the reinforcing layer 12, wherein the reinforcing layer 12 is fabricated of a woven conductor such as copper, aluminum, or stainless steel wire, or can be encased within the cover layer 16.

Figure 3:
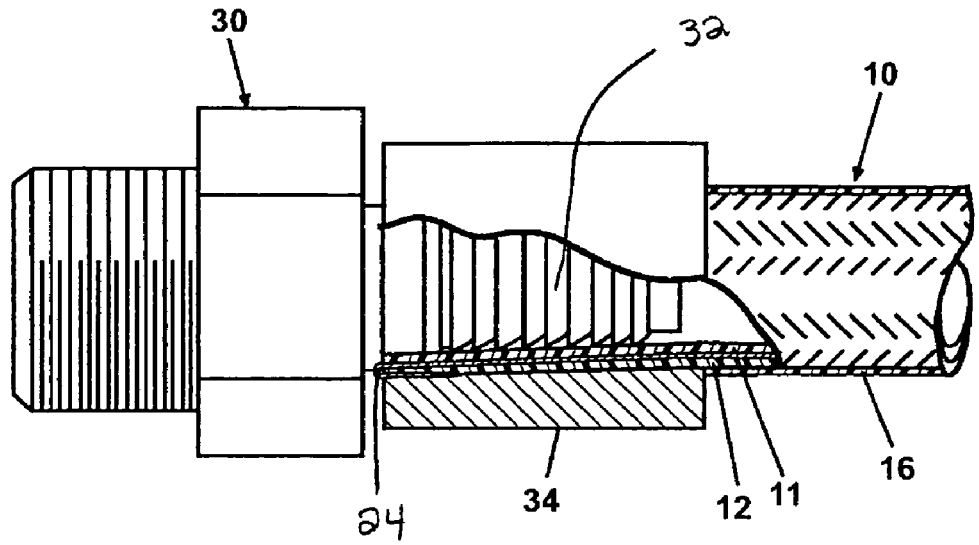
FIG. 3 is a cutaway view of the hose illustrated in FIG. 1 having an end coupling attached thereto for connecting two lengths of hose.

As illustrated in FIG. 3, the hose 10 terminates in a generally well-known coupling 30 for connecting lengths of hose 10 together. The illustrated coupling 30 has an elongate, annular insert 32 which is slidably or frictionally received in the inner tube 11. A collar 34 is illustrated encircling the hose 10 to compress the hose 10 against the insert 32 to retain the insert 32 on the hose end. The hose 10 is cut to a selected length and prepared so that the transmitting lead 24 extends beyond the hose end and is configured to contact the coupling 30 when the coupling 30 is attached to the hose 10. In FIG. 3, the transmitting lead 24 is illustrated as emerging from the hose 10 and folding back over the hose end to engage the collar 34.

Alternatively, the hose 10 can be cut so that the transmitting lead 24 does not extend beyond the hose end and the lead 24 remains encased within the interior sidewall of the hose. Consequently, an area of transmitting lead 24 will be exposed at the plane of the cut. A conductive medium, such as an electrically conductive acrylic or polyurethane paint manufactured by Tecknit of Cranford, N.J., can be applied to the interior of the coupling 30 to contact the transmitting lead 24, when the coupling 30 is assembled to the hose 10, and establish electrical conductivity from the lead 24 through the conductive medium to the coupling 30. In yet another alternative, the hose 10 can be cut to a selected length and prepared so that the transmitting lead 24 extends beyond the hose end and can be folded back into the inner tube 11 to engage the insert 32. In any of these configurations, electrical continuity will be established between the transmitting lead 24 and the coupling 30.

Figure 4:
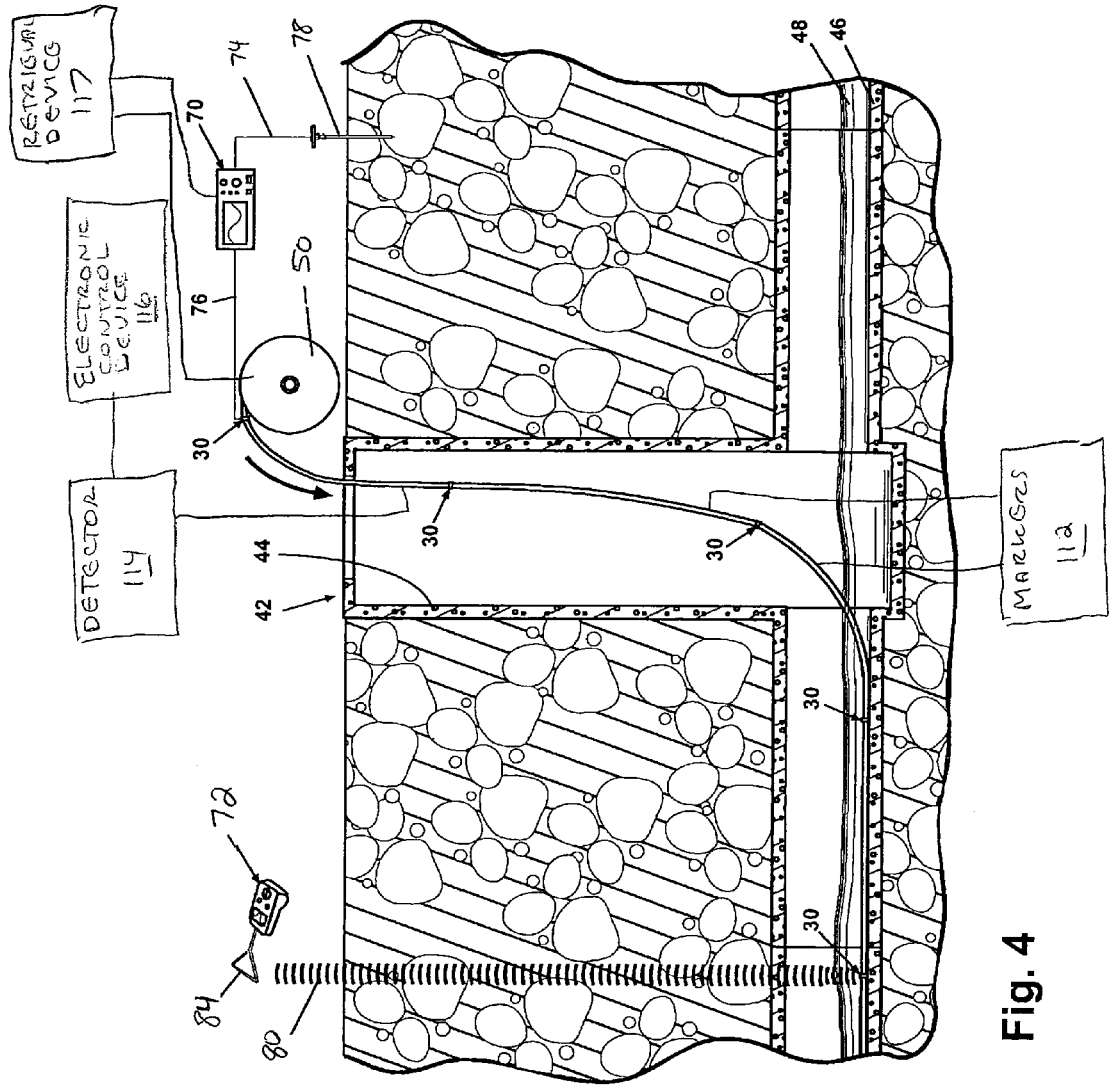
FIG. 4 is a schematic view of a detection system and method of use of a hose according to the invention utilized in an underground sewer system.

FIG. 4 illustrates an example of an application of the hose 10 in a portion of an underground sewer system 42. The illustrated sewer system 42 has a manhole 44 extending through the soil from the ground surface to a preselected depth, and a sewer line 46 extending through the soil to intercept a lower portion of the manhole 44. A liquid 48 fills a portion of the manhole 44 and the sewer line 46.

The hose 10 consists of a plurality of hose sections which are connected through couplings 30 to form a hose 10 of a selected length. As hereinbefore described, the hose sections are electrically interconnected through the couplings 30 and transmitting leads 14. The hose 10 is paid out from a reel 50 through the manhole 44 into the sewer line 46 in a generally well-known manner.

The location of the hose 10 in the sewer system 42 can be determined through the use of a signal/frequency generator 70 and a receiver 72. The frequency generator 70 is used to electrically energize the transmitting lead 24, and has a ground lead 74 and a signal lead 76. The ground lead 74 is connected to a ground anchor 78 which is driven into the soil. The signal lead 76 is connected to a coupling 30, and transmits current having a preselected frequency through the coupling 30 to the transmitting lead 24 along the length of the hose 10. The current sets up an electromagnetic field 80 that can be sensed by the receiver 78. The electromagnetic field 80 extends away from the sewer line 46 toward the ground surface. It has been found that the field 80 is unaffected by concrete, clay, or plastic pipe, but that iron pipe can block or attenuate the field 80.

The receiver 72 is a well-known electronic device having an antenna 84 suitable for detecting the field 80, and providing a display that gives an indication of a value associated with the field that is proportional to the strength of the field 80. An example of a suitable receiver 72 is a NaviTrack™ locator manufactured by Rigid Tool Company. The receiver 72 is tuned to the frequency generated by the frequency generator 70 and is moved over the ground surface. The locations of maximum field strength are noted and can be identified on the ground. These locations correspond to the path of the hose 10 and, consequently, the path of the sewer line 46. The hose 10 can be utilized to clean portions of the sewer line 46 by conveying high-pressure fluid to selected portions. The location of the hose 10, and the portions of the sewer line 46 that have been cleaned, can be readily determined during the cleaning process without the necessity of a separate locating device or procedure, thereby saving time and expense. The hose 10 can thus minimize the risk of inadvertently overlooking a portion of the sewer line 46 and failing to clean it, or recleaning portions of the sewer line 46 due to inaccurate information regarding the locations previously cleaned.

The depth of the sewer line 46 can also be determined since the strength of the field 80 is proportional to the depth of the hose 10. Thus, the sewer line 46 can be precisely located below ground in 3 dimensions.

Figure 5:
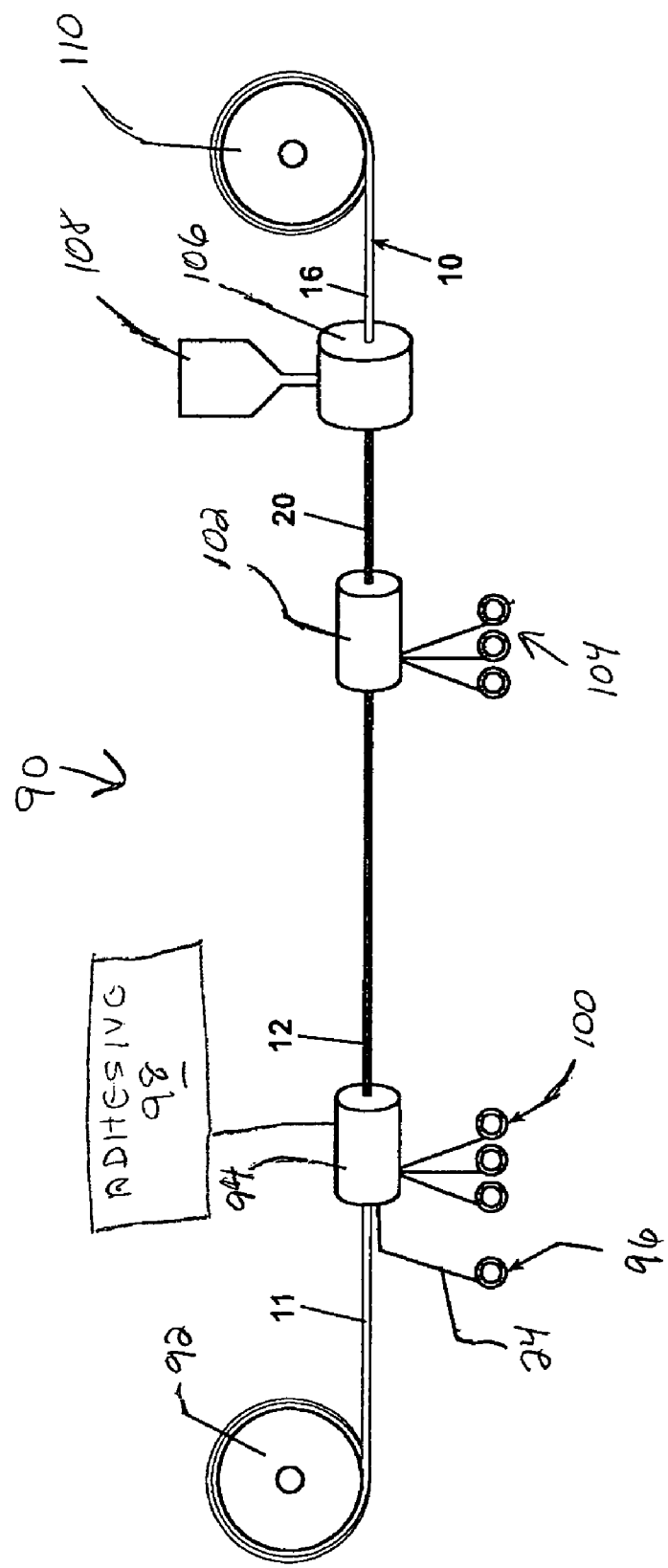
FIG. 5 is a schematic representation of a method of making the hose shown in FIG. 1.

With reference to FIG. 5, the hose 10 is fabricated in a hose fabrication line 90 as follows. The inner tube 11 is unwound from a roll 92 and enters a reinforcing weaving station 94 in which the reinforcing layer 12 is woven about the inner tube 11. The reinforcing weaving station 94 also feeds the transmitting lead 24 from a transmission wire supply roll 96 onto the inner tube 11 immediately prior to the installation of the reinforcing layer 12 around the inner tube 11. An adhesive 98 can also be applied in the reinforcing weaving station 94 to fix the transmitting lead 24 to the inner tube 11. Alternatively, the tube 11 can be extruded.

One or more continuous multifilament fibers are fed from multifilament fiber rolls 100 to the reinforcing weaving station 94 for fabrication of the reinforcing layer 12. The reinforced inner tube 11 then enters a second reinforcing weaving station 102 at which a second reinforcing layer 20 is woven about the hose over the first reinforcing layer 11. One or more continuous multifilament fibers are fed from multifilament fiber rolls 104 to the reinforcing weaving station 102 for fabrication of the second reinforcing layer 20. The hose then enters a cross-head extruder 106 which extrudes the cover layer 16 over the abrasion-resistant layer 14. The material utilized in the cover layer 16 is continuously supplied to the cover extrusion station 106 from a cover material supply hopper 108. The finished hose 10 is then stored on a hose take-up roll 110. The finished hose 10 is later cut to selected lengths and the couplings 30 are attached as hereinbefore described.

For hose having an inner diameter less than or equal to ⅜ inch, the wire braid transmitting lead 24 preferably has a diameter of 3/64 inch. For hose having an inner diameter greater than ⅜ inch, the wire braid transmitting lead 24 preferably has a diameter of 3/32 inch. As illustrated in FIG. 2, where the reinforcing layer 12 wraps over the transmitting lead 24, the wall of the hose 10 will be somewhat asymmetrical. The use of braided wire is preferred because the degree of the asymmetry will be reduced due to flattening of the braided wire.

The hose 10 can also incorporate integral markers 112 (FIG. 4) positioned at predetermined periodic intervals along its length for determining the length of hose 10 installed in a buried pipeline. The markers 112 can be made from ferrous metal pieces or microchips carried by a strip that can be placed anywhere in the hose 10 from the inner tube 11 to the outer cover 16. Alternatively, the markers 112 can be independently impregnated into the hose 10 without the use of a carrier strip.

As the hose 10 is inserted into a pipeline, it passes by or through a detector 114 (FIG. 4), such as an inductive coil, connected with an associated electronic control device 116. When the markers 112 are ferrous metal pieces, the number of markers 112 that pass the detector 114 are counted, and the length of hose can be calculated. When the markers 112 are in the form of microchips, the markers 112 are capable of more complex functions, such as measuring temperature or strain/elongation under pressure. When the hose 10 is removed from the pipeline, as by an automatic retrieval device 117 associated with the reel 50, the control device 116 can be programmed to set off an alarm at a predetermined distance from the hose end to signal the operator to adjust the take-up/retrieval speed for the device 117 for paid out hose.

While the invention has been specifically described in connection with certain specific embodiments thereof, it is to be understood that this is by way of illustration and not of limitation. Reasonable variation and modification are possible within the scope of the forgoing description and drawings without departing from the spirit of the invention, which is described in the appended claims.

Figure 6:
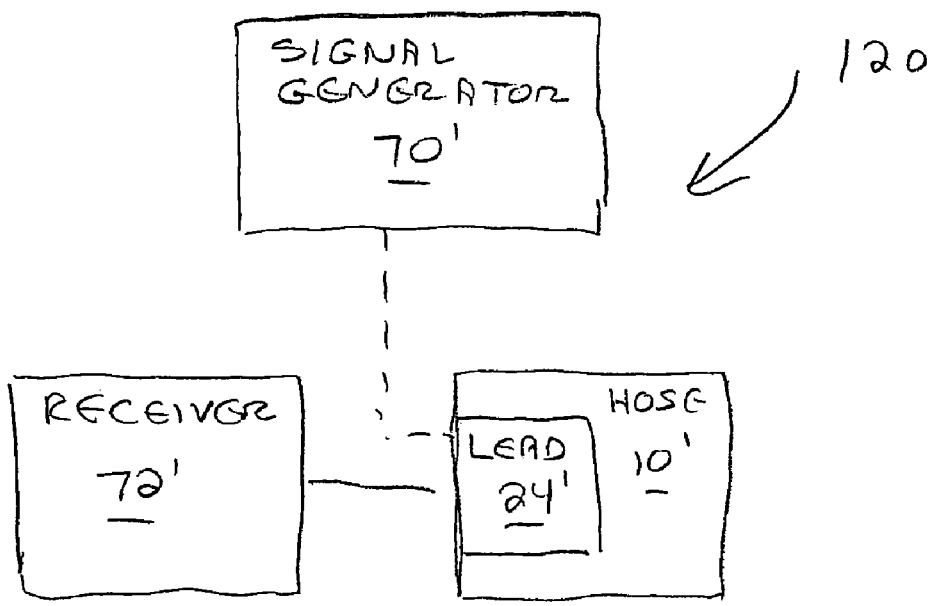
FIG. 6 is a schematic representation of a system, according to the invention, including a hose, signal generator, and a receiver.

As but one example, a system may generate a current without hard wire connection over the length of the hose. A self-contained power supply might be used with an electrical "lead" in the hose for this purpose and functions as a signal generator. Alternatively, a remote "generator" might induce a current in an electrical "lead" on the hose without a direct wired interaction. These alternative designs are encompassed generically by the system shown at 120 in FIG. 6 and consisting of a hose 10', a signal generator 70' and a receiver 72' for a field that is caused to be created through a lead 24' on the hose 10'.

The invention claimed is:

1. In combination:
   a) hose comprising:
      at least one layer defining a tubular body with a length; and
      an electrically conductive lead joined to the tubular body and extending along the length of the tubular body,
      the electrically conductive lead adapted to receive an electrical signal and create an electromagnetic field that can be remotely detected to determine a location of the hose;
   b) a supply of pressurized fluid that is directed through the hose; and
   c) a generator for a signal that is received by the electrically conductive lead and causes an electromagnetic field to be created,
   wherein the tubular body comprises an inner tube through which pressurized fluid passes, a cover layer around the inner tube, and a reinforcing layer between the inner tube and cover layer,
   the electrically conductive lead encapsulated between the inner tube and cover layer.

2. The combination according to claim 1 further in combination with a receiver for detecting the electromagnetic field and providing an indication as to the location of the hose.

3. The combination according to claim 1 wherein the electrically conductive lead comprises a wire.

4. The combination according to claim 1 wherein the electrically conductive lead comprises a flat braided wire.

5. The combination according to claim 1, wherein the electrically conductive lead comprises a wire that is adhered to the inner tube.

6. The combination according to claim 1 wherein the electrically conductive lead is interwoven with the reinforcing layer.

7. The combination according to claim 1 wherein the reinforcing layer comprises a woven conductor that defines the electrically conductive lead.

8. The combination according to claim 1 wherein the hose has an end with a conductive coupling and the electrically conductive lead is electrically connected to the coupling so that an electrical signal can be directed through the coupling to another hose.

9. The combination according to claim 2 wherein the generator comprises a signal/frequency generator that transmits current at a preselected frequency to set up the electromagnetic field.

10. The combination according to claim 2 wherein the receiver gives an indication of a value associated with the electromagnetic field that is proportional to the strength of the electromagnetic field so that a distance between the receiver and the electrically conductive lead can be ascertained.

11. The combination according to claim 2 in combination with a subterranean pipeline through which the hose is directed.

12. In combination
a) hose comprising:
at least one layer defining a tubular body with a length; and
an electrically conductive lead joined to the tubular body and extending along the length of the tubular body,
the electrically conductive lead adapted to receive an electrical signal and create and electromagnetic field that can be remotely detected to determine a location of the hose;
b) a supply of pressurized fluid that is directed through the hose; and
c) a generator for a signal that is received by the electrically conductive lead and causes an electromagnetic field to be created,
wherein there are a plurality of markers on the hose that can be detected to determine a length of the hose that has been extended.

13. The combination according to claim 12 in combination with a detector for sensing a number of markers that pass by the detector.

14. In combination:
a) a hose comprising:
at least one layer defining a tubular body with a length; and
an electrically conductive lead joined to the tubular body and extending along the length of the tubular body,
the electrically conductive lead adapted to receive an electrical signal and create an electromagnetic field that can be remotely detected to determine a location of the hose,
wherein there are a plurality of markers on the hose that can be detected to determine a length of hose that has been extended; and
b) a control device which is capable of controlling a retrieval speed for the hose based upon the detection of the markers.

15. In combination:
a signal generator;
a hose having a tubular body with a length;
an electrical lead on the body adapted to receive an electrical signal from the signal generator and create an electromagnetic field;
a receiver for detecting the electromagnetic field and providing an indication as to the location of the hose,
wherein the signal generator is provided on the hose.

16. The combination according to claim 15 wherein the signal generator and electrical lead interact wirelessly.

17. A method of determining the location of a hose, the method comprising the steps of:
forming a hose with a tubular body comprising an inner tube through which pressurized fluid can pass a cover layer around the inner tube, a reinforcing layer between the inner tube and cover layer and an electrically conductive lead encapsulated between the inner tube and cover layer;
moving the hose;
directing a pressurized supply of fluid through the hose;
causing an electrical current to be generated in the electrically conductive lead that creates an electromagnetic field; and
detecting the electromagnetic field to thereby determine the location, and track movement, of the hose.

18. The method of determining the location of a hose according to claim 17 wherein the step of forming a hose comprises forming a hose with an electrically conductive lead that comprises a wire.

19. The method of determining the location of a hose according to claim 17 wherein the step of forming a hose comprises forming a hose with an electrically conductive lead that comprises a flat braided wire.

20. The method of determining the location of a hose according to claim 17 wherein the step of forming a hose comprises forming a hose with an electrically conductive lead that is interwoven with the reinforcing layer.

21. The method of determining the location of a hose according to claim 17 wherein the step of detecting the electromagnetic field comprises sensing the strength of the electromagnetic field to thereby allow a distance from the hose to be ascertained.

22. The method of determining the location of a hose according to claim 17 further comprising the step of directing the hose through a subterranean pipeline.

23. The method of determining the location of a hose according to claim 17 further comprising the steps of: directing the hose through a subterranean pipeline up to an obstruction in the subterranean pipeline and through detection of the electromagnetic field determining a location of the obstruction.

24. A method of determining the location of a hose, the method comprising the steps of:
forming a hose with an electrically conductive lead;
causing an electrical current to be generated in the electrically conductive lead that creates an electromagnetic field;
detecting the electromagnetic field to thereby determine the location of the hose;
wherein the step of forming a hose comprises forming a hose with a plurality of markers thereon and further comprising the step of moving the hose and detecting the markers to thereby determine a length of the hose that has been extended.

25. The method of determining the location of a hose according to claim 24 further comprising the step of controlling a retrieval speed for paid out hose based upon the detection of the markers.

26. In combination:
a) a hose comprising:
at least one layer defining a tubular body with a length; and
an electrically conductive lead joined to the tubular body and extending along the length of the tubular body,
the electrically conductive lead adapted to receive an electrical signal and create an electromagnetic field that can be remotely detected to determine a location of the hose,
wherein there are a plurality of markers on the hose; and
b) a detector for sensing a number of markers that pass by the detector and therein calculating a length of hose that has passed by the detector.

* * * * *

UNITED STATES PATENT AND TRADEMARK OFFICE
CERTIFICATE OF CORRECTION

PATENT NO. : 7,308,911 B2  Page 1 of 1
APPLICATION NO. : 11/211857
DATED : December 18, 2007
INVENTOR(S) : Daniel Wilkinson It is certified that error appears in the above-identified patent and that said Letters Patent is hereby corrected as shown below:

Title Page item 73
 The correct spelling of the name of the Assignee is as follows:
  Kuriyama of America, Inc.

Signed and Sealed this

Third Day of June, 2008

JON W. DUDAS
*Director of the United States Patent and Trademark Office*